United States Patent [19]

Billet

[11] Patent Number: 4,835,747

[45] Date of Patent: May 30, 1989

[54] COMPENSATING SENSOR DEVICE FOR A CHARGE AMPLIFIER CIRCUIT USED IN PIEZOELECTRIC HYDROPHONES

[75] Inventor: Daniel Billet, St Paul De Vence, France

[73] Assignee: Thomson-CSF, Paris, France

[21] Appl. No.: 180,314

[22] Filed: Apr. 11, 1988

[30] Foreign Application Priority Data

Apr. 14, 1987 [FR] France .............................. 87 05266

[51] Int. Cl.[4] ........................................... H04R 17/00
[52] U.S. Cl. .................................... 367/164; 367/135; 310/337; 310/800; 381/120
[58] Field of Search ............... 310/316, 317, 319, 357, 310/358, 359, 366, 337, 800; 367/135, 155, 157, 158, 159, 160, 161, 164, 180; 381/114, 120, 121, 173, 190; 330/252, 261, 5.5

[56] References Cited

U.S. PATENT DOCUMENTS

| | | | |
|---|---|---|---|
| 3,659,123 | 4/1972 | Oya ..................................... | 310/320 |
| 4,149,102 | 4/1979 | Kellen ................................. | 310/320 |
| 4,451,710 | 0/0000 | Taylor et al. .................... | 310/800 X |
| 4,517,665 | 5/1985 | DeReggi et al. .................... | 310/800 |
| 4,695,988 | 9/1987 | Banno ............................. | 367/159 X |
| 4,709,360 | 11/1987 | Martin et al. ....................... | 367/157 |

FOREIGN PATENT DOCUMENTS 2314506 of 0000 France .

OTHER PUBLICATIONS

IEEE Transactions on Sonics and Ultrasonics, vol. SU-29, No. 6, Nov. 1982, pp. 370-377, New York, US; G. R. Harris: "Sensitivity considerations for PVDF hydrophones using the spot-poled membrane design" p. 372, paragraph B: Charge amplifier.

Primary Examiner—Brian S. Steinberger
Attorney, Agent, or Firm—Oblon, Fisher, Spivak, McClelland & Maier

[57] ABSTRACT

To compensate for the effect of external parameters on piezoelectric sensors connected to a charge amplifier, a small portion of this sensor is used to form the feedback capacitor of the amplifier. These parameters then have the same effect on the sensor and on the capacitor, thus making it possible to provide compensation to hydrophones made of piezoelectric polymer material.

10 Claims, 2 Drawing Sheets

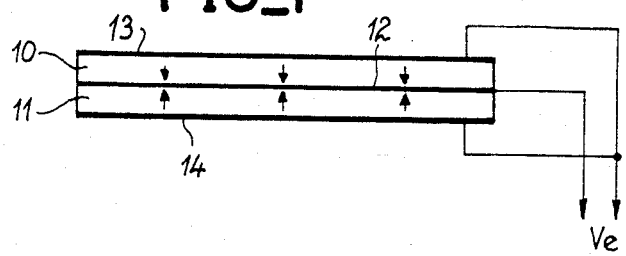
FIG_1 PRIOR ART
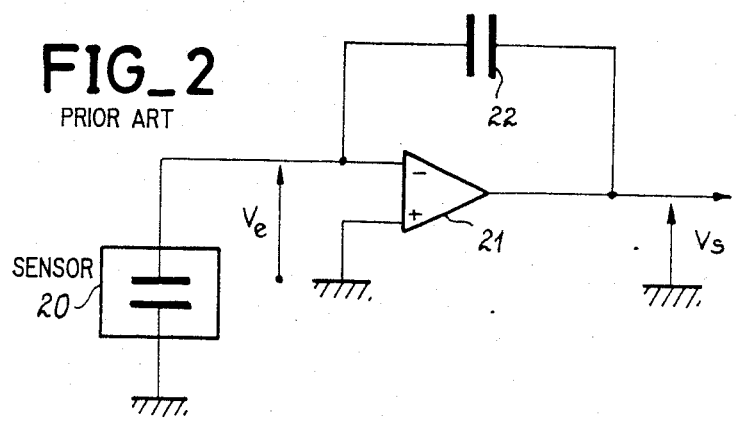
FIG_2 PRIOR ART
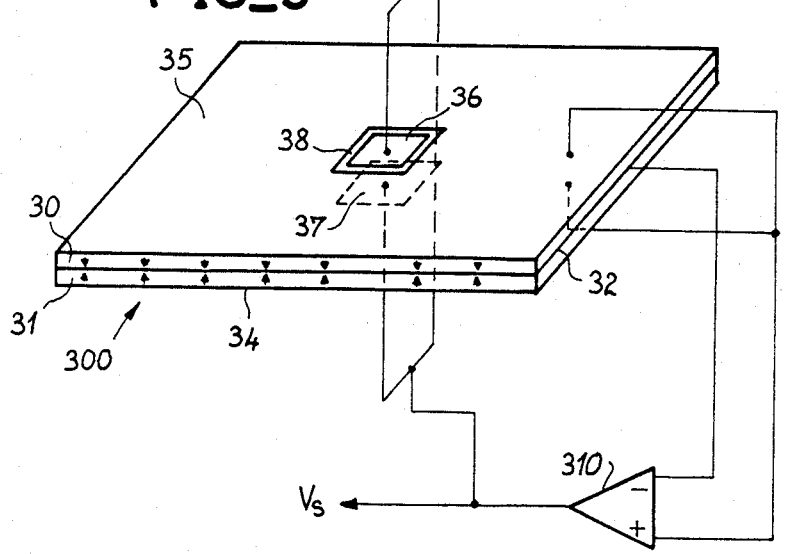
FIG_3

FIG_4
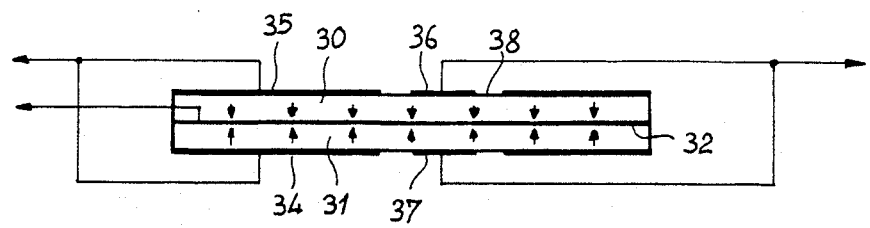
FIG_5
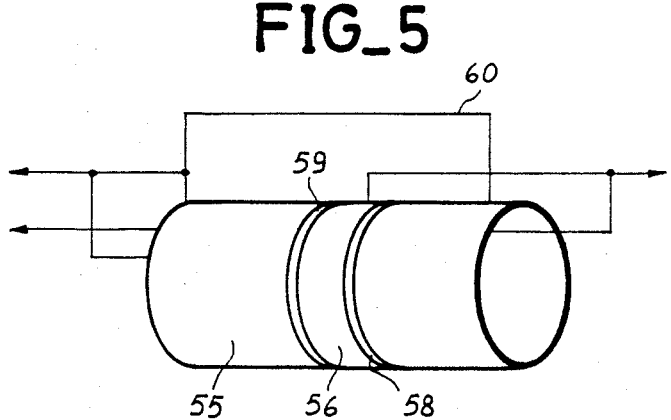

COMPENSATING SENSOR DEVICE FOR A CHARGE AMPLIFIER CIRCUIT USED IN PIEZOELECTRIC HYDROPHONES

BACKGROUND OF THE INVENTION

1. Field of the Invention

The present invention relates to charge amplifier circuits having compensating characteristics. It is especially suited to circuits used to amplify the signals of piezoelectric hydrophones, especially signals of hydrophones using a piezoelectric polymer material.

2. Description of the Prior Art

There are many known ways of making acoustic antennas with piezoelectric sensors. The material of these antennas is a piezeoelectric polymer or co-polymer such as PVF 2.

FIG. 1 shows a sectional view of the structure generally used for a sensor of this type.

This sensor has two polymer layers 10 and 11, separated by a conducting electrode layer 12. These two layers are biased in the direction of their thickness, and in opposite directions. Their outer side is covered with conducting electrodes 13 and 14. The electrical output signal Ve is taken between the central electrode and these two external electrodes which are connected together.

Each of these sensors, called surface sensors, may have the shape of a rectangle of considerable size, with an area that may exceed 100 cm2.

There are known ways to connect these sensors in parallel to make a large-sized, flat acoustic antenna.

Owing to their flexibility, these sensors can also be given other shapes. For example, they may be given a cylindrical shape, by being placed inside or outside an insulating cylinder.

A common way of amplifying the output signal Ve of the sensor is to use a charge amplifier, the diagram of which is shown in FIG. 2.

The sensor 20 is connected by one of its electrodes to the input of a differential amplifier 21 with very high gain and very high input impedance. This type of amplifer, called an operational amplifier, is quite common. The + input of this amplifier is connected to the ground, like the other electrode of the sensor.

The output of the amplifier 21 is connected to its − input by means of a feed-back capacitor 22 with a capacitance $C_r$.

From the electrical point of view, the sensor 20 is a capacitor with a capacitance $C_h$. The output signal $V_s$ is therefore given by:

$$V_s = -\frac{C_h - C_r}{C_r} V_e$$

Owing to the dimensions of the sensor, the capacitance $C_h$ is relatively great and, by choosing a value $C_r$ which is very small compared with $C_h$, the amplification of the assembled unit is substantially equal to:

$$\frac{V_s}{V_e} = -\frac{C_h}{C_r}$$

The sensor 20 not only reacts to the sound signals that it receives by delivering a variable signal $V_e$, bu is also sensitive to several external parameters, especially hydrostatic pressure and temperatue, which cause the capacitance $C_h$ to vary. This causes considerable variation, as regards both amplitude and phase, in the transfer function $V_s/V_e$. The result of this is a high degree of measuring uncertainty. This disadvantage is especially great for acoustic antenna mounted on vehicles, such as submarines or towed sonar devices, with varying depths of immersion.

SUMMARY OF THE INVENTION

To remove this disadvantage, the invention proposes to replace the capacitor 22 by a small portion of the sensor 20 itself, thus automatically compensating for the action of external factors.

BRIEF DESCRIPTION OF THE DRAWINGS

Other features and advantages of the invention will appear more clearly from the following description, given as a non-exhaustive example and made with reference to the appended figures, of which:

FIG. 1 is a sectional view of a piezoelectric sensor;

FIG. 2 is a diagram of a charge amplifier for a sensor of this type.

FIG. 3 is a diagram of a charge amplifer provided with a sensor modified according to the invention;

FIG. 4 is a sectional view of the sensor 13 of FIG. 3; and

FIG. 5 is a view of a cylindrically shaped sensor according to the invention.

DESCRIPTION OF THE PREFERRED EMBODIMENT

FIG. 3 shows a sensor 300 modified according to the invention and connected to a charge amplifier 310, and FIG. 4 shows a section of this sensor.

As in FIG. 1, this sensor 300 has two piezoelectric layers 30 and 31 biased in opposite directions, one central electrode 32 and two external electrodes 34 and 35.

The external electrodes are parallel-connected to the + input of the amplifier 310, and the central electrode is connected to the − input.

To form the feedback capacitor, cuts are made in the external electrodes to form two small identical portions 36 and 37, which are insulated from external electrodes 35 and 34, respectively, and face each other. In the figure, the cut 38, forming the portion 36, is square-shaped, but it may have any shape. For example, it may be circular.

Each of these portions 36 and 37 forms a small capacitor with the central electrode. The behaviour of these small capacitors with respect to the external parameters is the same as that of the big capacitors formed by the remaining portions of the external electrodes and the central electrode. To make it even more certain that the behaviour of these big and small capacitors will be identical, it is preferable to locate the portions 36 and 37 at the center of the sensor. However, especially to make it easier for the connections, these portions may be located near the edges while, at the same time, preserving a very satisfactory level of operation.

The feedback capacitor is obtained by connecting the two portions 36 and 37 in parallel to the output of the amplifier 310, the central electrode being connected to the − input as has been seen above. The capacitance of this feedback capacitor is therefore twice that of the two small capacitors which are thus connected in parallel. The same is true for the capacitance of the rest of the sensor, i.e., the sensor capacitor, which is equivalent to that of the big capacitors connected in parallel. It will be observed that, since the central electrode is common to the sensor capacitor and the feedback capacitor, it must be connected to the − input of the amplifier in order to actually get a feedback. For, according to the usual conventions, the gain of the amplifier is positive for the + input and negative for the − input.

In this way, the feedback capacitor has the same behaviour as the capacitor formed by the sensor, and only the values of the capacitances differ, their ratio being equal to the ratio between the areas used. It will also be noted that it is then no longer necessary to adjust the value of the feedback capacitor according to the actually used sensor, the capacitance of which may vary from one sample to another, since the desired ratio is obtained automatically by construction. There is, therefore, automatic compensation regardless of the disturbance-casing parameters applied to the sensor provided that (and this is the most usual case) these parameters are uniform throughout the sensor and are not localized in one part of it. Another result of this is considerable improvement in the reproducibility of the sensor/preamplifier sets which constitute the antenna since, in most embodiments, a certain number of sensors, provided with an amplifier, are associated together as in FIG. 3. In this case, this amplifier plays the role of a preamplifier.

It is quite possible to make the sensor in other shapes, and FIG. 5 shows an example of a cylindrical sensor modified according to the invention, wherein the feedback capacitor is formed by a small ring 56, demarcated on the external electrode 55 by two circular cuts 58 and 59. A connection 60 connects the two parts of the electrode 55 separated by the ring 56. In this embodiment, there is only one layer of piezoelectric material and two electrodes, of which the one inside the cylinder (but outside the piezoelectric layer) is not cut out. The operation of this sensor is, nevertheless, absolutely similar to that of the previous embodiment and of course, it is possible to use a cylinder with two layers and three electrodes.

What is claimed is:

1. A compensating device for a charge amplifier circuit used in piezoelectric hydrophones comprising:
    a first insulating piezoelectric layer having a first side and a second side;
    a first external conducting electrode and a second external conducting electrode, said first electrode interfaced with the first side of said first insulating piezoelectric layer and said second electrode covering the second side of said piezoelectric layer such that a capacitor is formed;
    a differential operational amplifier having an output, a negative input and a positive input, the first and the second external electrodes being connected to the positive input of said differential amplifier;
    a feedback capacitor connected to the output of said differential operational amplifier;
    said feedback capacitor comprising a first isolated portion of said first external conducting electrode and a second isolated portion of said second external conducting electrode, said first isolated portion and said second isolated portion being connected to the output of said differential operational amplifier.

2. A compensating sensor device according to claim 11, wherein:
    said first isolated portion is centered on said first piezoelectric layer and said second isolated portion is centered on said second piezoelectric layer.

3. A compensating sensor device according to claim 1, wherein:
    said first piezoelectric layer is cylindrical and hollow.

4. A compensating sensor device according to claim 1, wherein:
    said first piezoelectric layer has a rectangular shape.

5. A compensating sensor device according to claim 1, wherein:
    said first piezoelectric layer is made of a piezoelectric polymer.

6. A compensating sensor device according to claim 1, further comprising:
    a second insulating piezoelectric layer;
    a central electrode sandwiched between the first piezoelectric layer and the second piezoelectric layer, said second external electrode being interfaced with said second piezoelectric layer;
    said first isolated portion and said second isolated portion being connected in parallel and positioned in a face to face manner.

7. A compensating sensor according to claim 6, wherein:
    said first external electrode and said second external electrode are connected in parallel.

8. A compensating sensor according to claim 7, wherein:
    said central electrode is connected to the negative input of said differential operational amplifier.

9. A compensating sensor according to claim 6, wherein:
    a surface area of said first isolated portion and a surface area of said second isolated portion are identical.

10. A compensating sensor according to claim 9, wherein:
    the surface area of said first isolated portion and the surface area of the second isolated portion determine the capacitance of said feedback capacitor.

* * * * *